US012760144B2

(12) United States Patent
Moore et al.

(10) Patent No.: US 12,760,144 B2
(45) Date of Patent: Oct. 13, 2026

(54) METHOD OF SPONTANEOUSLY PATTERNING A POLYMER DURING FRONTAL POLYMERIZATION

(71) Applicant: The Board of Trustees of the University of Illinois, Urbana, IL (US)

(72) Inventors: Jeffrey S. Moore, Savoy, IL (US); Philippe H. Geubelle, Champaign, IL (US); Nancy R. Sottos, Champaign, IL (US); Elizabeth C. Firestone, Midland, MI (US); Evan M. Lloyd, Maryville, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 643 days.

(21) Appl. No.: 18/265,141

(22) PCT Filed: Dec. 6, 2021

(86) PCT No.: PCT/US2021/062006
§ 371 (c)(1),
(2) Date: Jun. 2, 2023

(87) PCT Pub. No.: WO2022/125437
PCT Pub. Date: Jun. 16, 2022

(65) Prior Publication Data

US 2024/0026068 A1 Jan. 25, 2024

Related U.S. Application Data

(60) Provisional application No. 63/123,736, filed on Dec. 10, 2020.

(51) Int. Cl.
*C08G 61/08* (2006.01)

(52) U.S. Cl.
CPC ..... *C08G 61/08* (2013.01); *C08G 2261/3324* (2013.01); *C08G 2261/3325* (2013.01); *C08G 2261/418* (2013.01)

(58) Field of Classification Search
None
See application file for complete search history.

(56) References Cited

U.S. PATENT DOCUMENTS 10,828,608 B2 11/2020 Zhang et al.
2018/0230642 A1 8/2018 Robertson et al.
(Continued)

FOREIGN PATENT DOCUMENTS

CN 103936896 A 7/2014
JP 2019150818 A 9/2019
(Continued)

OTHER PUBLICATIONS

Pojman, J. A. et al., "Free-radical frontal polymerization: Self-propagating thermal reaction waves". J. Chem. Soc. Faraday Trans. 1996, 92, 2825-2837. (Year: 1996).*
(Continued)

*Primary Examiner* — Richard A. Huhn
(74) *Attorney, Agent, or Firm* — Crowell & Moring LLP

(57) ABSTRACT

A method of spontaneously patterning a polymer during frontal polymerization includes activating an initiation region of a monomer solution to reaction to initiate a polymerization reaction. A polymerization front is generated and propagates through the monomer solution in a radial or longitudinal direction away from the initiation region. The monomer solution is spontaneously heated downstream of the polymerization front by thermal transport away from the polymerization reaction. Once a localized region of the monomer solution reaches a temperature sufficient for spontaneous initiation of another polymerization reaction, a new
(Continued)

polymerization front is generated and propagates through the monomer solution in a circumferential or transverse direction. The spontaneous heating of the monomer solution downstream of the polymerization front and the initiation of another polymerization reaction occurs cyclically, producing multiple new polymerization fronts and spatial variations in reaction temperature across the monomer solution. Once polymerization is complete, a spontaneously patterned polymer is formed.

20 Claims, 8 Drawing Sheets

(56) References Cited

U.S. PATENT DOCUMENTS

| | | | |
|---|---|---|---|
| 2018/0327531 A1 | 11/2018 | Moore et al. | |
| 2020/0283594 A1 | 9/2020 | Sottos et al. | |
| 2022/0112332 A1 | 4/2022 | Moore et al. | |

FOREIGN PATENT DOCUMENTS

| | | |
|---|---|---|
| WO | WO 2017/068590 A1 | 4/2017 |
| WO | WO 2021/188332 A1 | 9/2021 |

OTHER PUBLICATIONS

Moore, The 4th Annual Review of Center of Excellence in "Self-Healing, Regeneration & Structural Remodeling," Sep. 22, 2020, pp. 1-31.

Dean et al., "Rapid Synthesis of Elastomers and Thermosets with Tunable Thermomechanical Properties," *ACS Macro Letters*, vol. 9, May 26, 2020, pp. 819-824.

International Search Report and Written Opinion from corresponding International Application No. PCT/US2021/062006, dated Mar. 1, 2022, 12 pp.

Robertson et al., "Rapid energy-efficient manufacturing of polymers and composites via frontal polymerization," Nature, vol. 557, No. 7704, May 8, 2018, pp. 223-227.

Extended European Search Report from corresponding European Application No. 21904184.5 dated Oct. 22, 2024, 6 pp.

* cited by examiner

FIG. 14
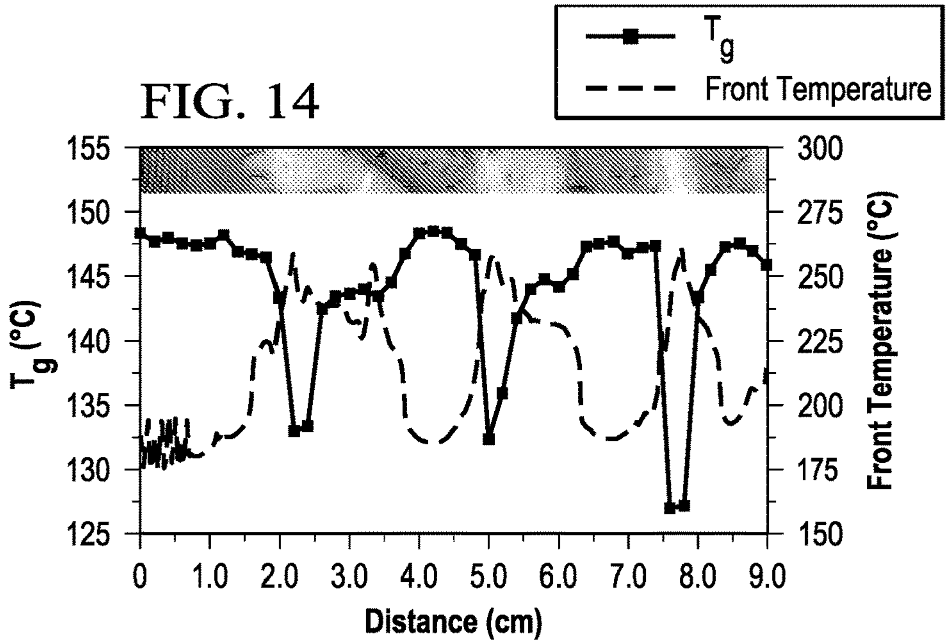
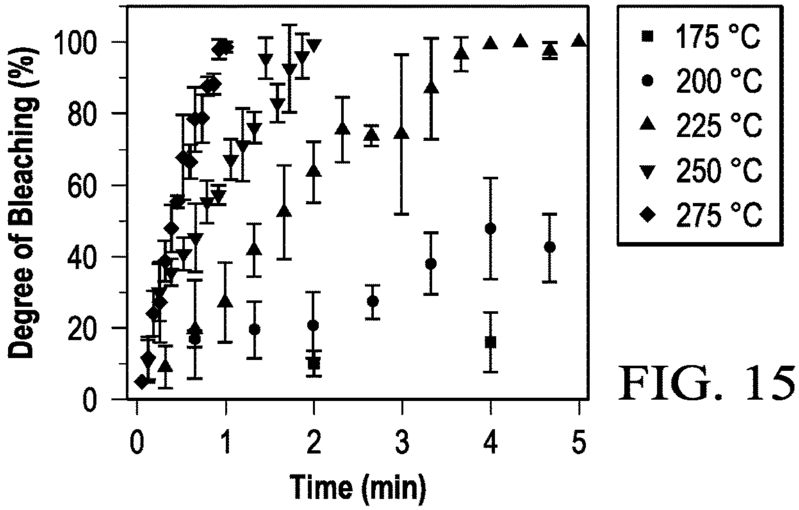
FIG. 15
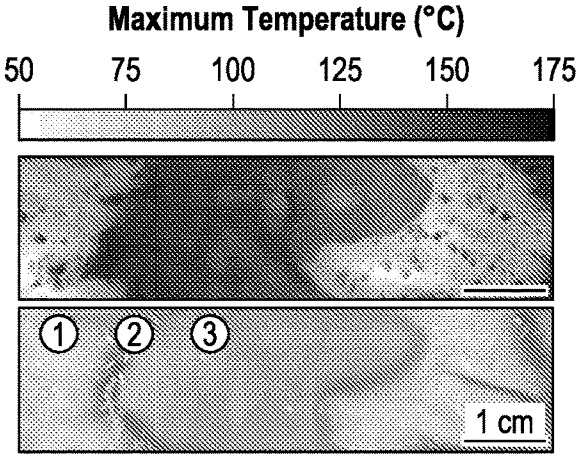
FIG. 16

METHOD OF SPONTANEOUSLY PATTERNING A POLYMER DURING FRONTAL POLYMERIZATION

The present patent document is the U.S. national stage of International Application No. PCT/US2021/062006, which was filed on Dec. 6, 2021, and which claims the benefit of priority under 35 U.S.C. 119(e) to U.S. Provisional Patent Application No. 63/123,736, which was filed on Dec. 10, 2020. Both of the aforementioned applications are hereby incorporated by reference in their entirety.

FEDERALLY SPONSORED RESEARCH OR DEVELOPMENT

This invention was made with government support under FA9550-16-1-0017 awarded by the Air Force Office of Scientific Research (AFOSR). The government has certain rights in the invention.

TECHNICAL FIELD

The present disclosure is related generally to polymer processing and more particularly to a method of spontaneous patterning during frontal polymerization.

BACKGROUND

Living organisms have evolved mechanisms to create diverse shapes, patterns, and structures. Morphogenesis, one of the most fundamental biological mechanisms to encode function, dictates when symmetrical collections of cells break symmetry to bud complex, patterned forms. Turing's postulate that biological patterns emerge through precise feedback-driven control of chemical reactions and mass transport has become the foundation of many theoretical and experimental descriptions of biological pattern formation.

Structural complexity and function in natural systems are derived from initial states of high symmetry. Turing postulated that patterns and asymmetry emerge spontaneously from initially symmetric states through precise feedback-driven promotion and inhibition of chemical reactions. Central to the feedback-driven control proposed by Turing are the coupled reaction and transport of chemical activators and inhibitors known as morphogens. These reaction-transport processes occur in non-equilibrium states, and temporal fluctuations initiate symmetry breaking events provided that the coupled chemical reactions are autocatalytic in nature. The patterns that Turing predicted were strikingly similar to patterns observed in nature. Twenty years after Turing's seminal paper, Gierer and Meinhardt posed that pattern emergence was dependent upon transport-driven instabilities that lead to local activation and long-range inhibition.

Strategies toward synthetic Turing systems have focused on tuning the mass diffusivities of small molecule activators and inhibitors by modification with macromolecules or by changing the reaction medium. These initial demonstrations are limited to solutions, gels, or thin membranes, as mass transport is prohibitively slow in solid media.

Frontal polymerization, or frontal ring-opening metathesis polymerization ("FROMP"), is an emerging method for rapid, energy-efficient manufacturing of bulk polymeric materials. In frontal polymerization, a monomer is converted to polymer within a localized reaction zone that propagates spatially as a consequence of heat transfer from the exothermic polymerization reaction to the unreacted monomer. Descriptions of frontal polymerization may be found in U.S. Patent Application Publication Nos. 2020/0283594 (Sottos et al.) and 2018/0327531 (Moore et al.) and in U.S. Pat. No. 10,487,446 (Robertson et al.), which are hereby incorporated by reference in their entirety.

BRIEF SUMMARY

A method of spontaneously patterning a polymer during frontal polymerization has been developed. The method includes activating an initiation region of a monomer solution to initiate a polymerization reaction. A polymerization front is generated and propagates through the monomer solution in a radial or longitudinal direction away from the initiation region. The monomer solution is spontaneously heated downstream of the polymerization front by thermal transport away from the polymerization reaction. Once a localized region of the monomer solution reaches a temperature sufficient for spontaneous initiation of another polymerization reaction, a new polymerization front is generated and propagates through the monomer solution in a circumferential or transverse direction. The spontaneous heating of the monomer solution downstream of the polymerization front and the initiation of another polymerization reaction occurs cyclically, producing multiple new polymerization fronts and spatial variations in reaction temperature across the monomer solution. Once polymerization is complete, a spontaneously patterned polymer is formed.

BRIEF DESCRIPTION OF THE DRAWINGS

FIG. 14 shows glass transition temperature (determined by DSC analysis) and maximum front temperature of a polymerized sample prepared from a monomer solution containing 2 wt % DBPDA as a function of distance from the initiation region; inset shows an optical image of the resulting spontaneously patterned polymer.

FIG. 15 shows ex situ bleaching data from pDCPD samples prepared from monomer solutions containing 2 wt. % DBPDA after heating on a hot stage at the indicated temperature, where degree of bleaching is determined by analyzing the yellow channel of optical images of the heated samples.

FIG. 16 shows a maximum temperature profile obtained from free-surface FROMP of 1,5-cyclooctadiene (top) and an optical image (bottom) of the spontaneously patterned polymer showing crystalline (white) and amorphous (yellow) domains.

DETAILED DESCRIPTION

Thermally driven reaction-transport networks provide a previously unexplored yet promising route to the formation of Turing patterns in structural materials, since thermal transport is orders of magnitude faster than mass transport in solids. In this disclosure, frontal polymerization is explored as an alternative to traditional reaction-mass transport networks for spontaneous pattern development in polymeric materials, such as strained cyclic olefins.

Figure 1:
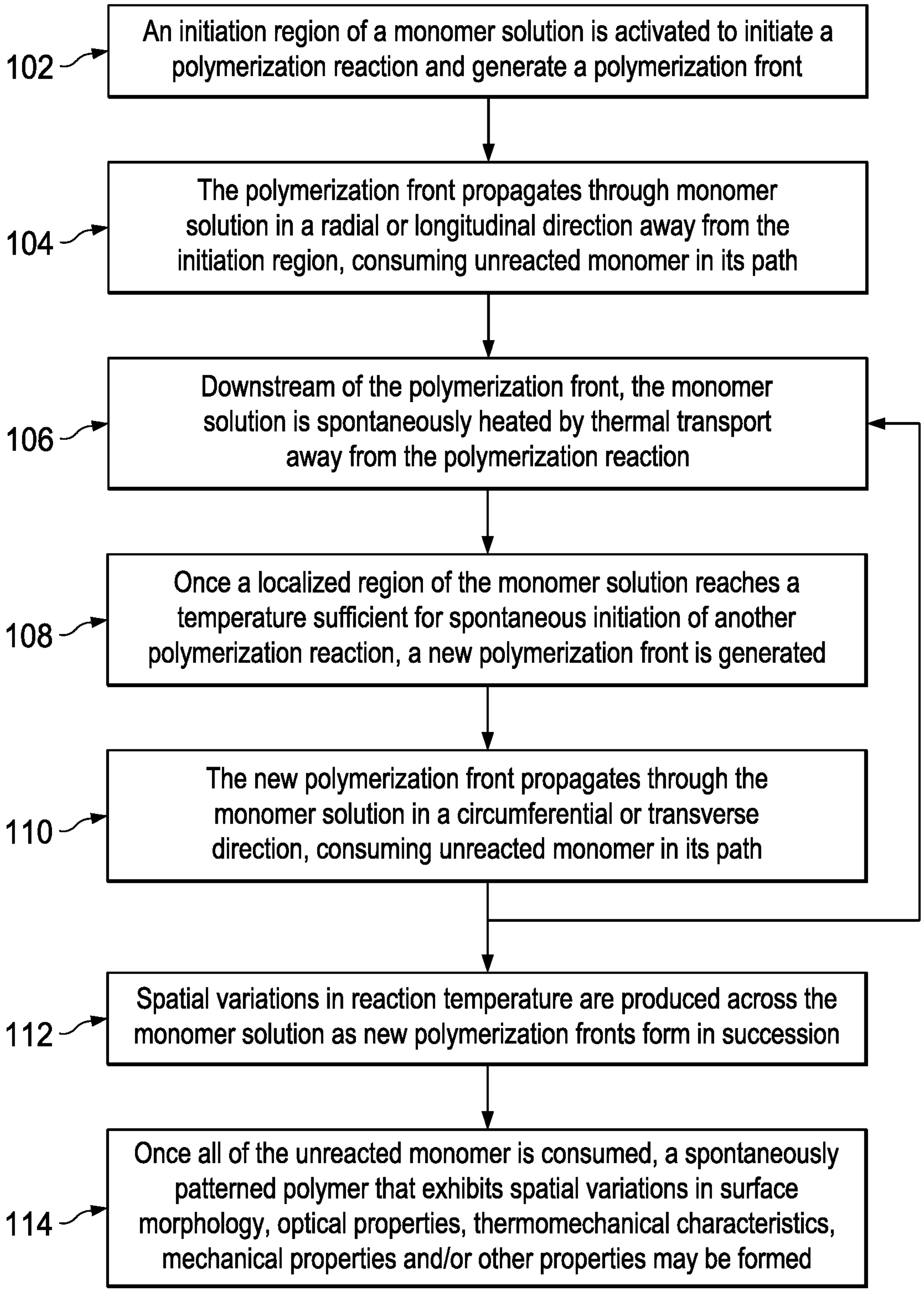
FIG. 1 shows a flow chart of an exemplary method of spontaneously patterning a polymer.

The method of spontaneously patterning a polymer during frontal polymerization is described in reference to the flow chart of FIG. 1. The method includes activating 102 an initiation region of a monomer solution to initiate a polymerization reaction and generate a polymerization front. The polymerization front propagates 104 through the monomer solution in a radial or longitudinal direction away from the initiation region. As the polymerization front moves through the monomer solution, unreacted monomer is consumed (polymerized). Downstream of the polymerization front, the monomer solution is spontaneously heated 106 by thermal transport away from the polymerization reaction, as will be explained below. Once a localized region of the monomer solution reaches a temperature sufficient for spontaneous initiation 108 of another polymerization reaction, a new polymerization front is generated and propagates 110 through the monomer solution in a circumferential or transverse direction, consuming unreacted monomer in its path. Spontaneous heating 106 of the monomer solution downstream of the polymerization front and the initiation 108 of another polymerization reaction may occur cyclically (e.g., when thermal power generation is balanced by power dissipation, as discussed below), producing 112 spatial variations in reaction temperature across the monomer solution as new polymerization fronts form in succession. Once all of the unreacted monomer is polymerized, a polymeric body that may exhibit spatial variations in surface morphology, crystallinity, polymer phases, optical properties, thermomechanical characteristics, mechanical properties and/or other characteristics is formed 114. The polymeric body may thus be described as a spontaneously patterned polymer.

The monomer solution may include one or more monomers, a catalyst, and/or an inhibitor. The one or more monomers may include a cyclic olefin monomer, such as dicyclopentadiene (DCPD) and/or 1,5-cyclooctadiene (COD). The one or more monomers may also or alternatively include ethylidene norbornene (ENB). After polymerization, a solid polymeric body comprising one or more polymers and/or copolymers is formed. For example, polydicyclopentadiene (pDCPD) and/or poly(cyclooctadiene) (pCOD) (also known as polybutadiene and/or poly(1, 4-butadiene)) may be formed by the polymerization reaction. Prior to polymerization, the one or more monomers in the monomer solution may be referred to as unreacted monomer, uncured monomer, partially-cured monomer, monomer gelled with a secondary gelling agent, and/or monomer gelled with a rheology modifier. The monomer solution may have a viscosity consistent with a liquid or gel, and may be contained in a mold or other container for frontal polymerization. The mold (open or closed) or other container may determine the geometry of the polymeric body formed once polymerization is complete. The monomer solution may further include other components, such as an organic solvent, gelling agent, rheology modifier, and/or a temperature-sensitive additive, as discussed further below. The temperature-sensitive additive may undergo a chemical reaction at a rate that depends on temperature, and thus may contribute to patterning of the polymer.

The spontaneously patterned polymer that results from polymerization may or may not exhibit visual signs of a pattern. For example, the patterning may refer to a spatial variation in mechanical properties that may not be evident from visual inspection alone. In other examples, the patterning may be visually apparent immediately following polymerization, or within some time period after polymerization during which another process (e.g., crystallization) takes place, influenced by the reaction temperatures during polymerization.

The polymeric body may take the shape of the mold or other container in which frontal polymerization is carried out. In experiments described below, cylindrical molds and rectangular channel molds are employed, where the cylindrical mold has a circular shape when viewed along a horizontal plane, and where the rectangular channel mold has a rectangular shape when viewed along a horizontal plane. Alternatively, the mold may have another polygonal, curved, or arbitrary shape when viewed along a horizontal plane. It is also contemplated that after polymerization, a polymeric body having the shape of the mold in which it was fabricated may undergo machining, laser cutting or another material removal process to arrive at a modified (e.g., more complex) shape.

Notably, the language employed in this disclosure to describe propagation of the polymerization front may reflect the shape of the mold; for example, with a cylindrical mold having a circular cross-section, the polymerization front may be described as propagating in a radial direction, and successive new polymerization fronts may be described as propagating in a circumferential direction. On the other hand, in the case of a rectangular channel mold or another mold geometry having a non-circular cross-section, the polymerization front may be described as propagating in a longitudinal direction and successive new polymerization fronts may be described as propagating in a transverse direction that intersects the longitudinal direction. In some examples, the term "radial" may be used interchangeably with the term "longitudinal" to describe propagation of the initial polymerization front, and the term "circumferential" may be used interchangeably with "transverse" in describing the motion of the successive new polymerization fronts.

Each of the catalyst and inhibitor in the monomer solution may be provided at a suitable concentration to control the polymerization reaction; for example, more catalyst can be added or the inhibitor concentration can be reduced to increase the propagation velocity and/or peak temperature of the polymerization front. The catalyst may comprise a $2^{nd}$ generation Grubbs catalyst (GC2) or another ruthenium catalyst. The inhibitor may comprise trimethyl phosphite (TMP), triethyl phosphite (TEP), triisopropyl phosphite (TIPP), tributyl phosphite (TBP), triphenyl phosphite (TPP), and/or 4-dimethylaminopyridine (DMAPF). Catalyst amounts from about 5 ppm to about 500 ppm, or more typically from about 50 ppm to about 300 ppm may be suitable, and inhibitor amounts from about 0.1 eq. to about 8 eq., or more typically from about 0.25 eq. to about 4 eq., with respect to the catalyst may be employed.

Frontal polymerization may occur rapidly. For example, the polymerization front may move through the monomer solution at a rate of at least about 5 cm/min (0.8 mm/s), at least about 7 cm/min (1.2 mm/s), and in some cases as high as, or even higher than, about 10 cm/min (1.6 mm/s). The rate may depend on the monomer(s) present, catalyst and/or inhibitor concentrations, and possibly other factors, such as boundary/initial conditions (e.g., ambient temperature, initial temperature of monomer solution, thermal diffusivity of mold/container). The polymerization front may have a linear shape, a curved shape or another shape, which may be influenced by the geometry of the initiation region, the type of monomer solution, the mold/container geometry, and/or other factors.

Activation to initiate the polymerization reaction may entail exposing the initiation region to heat, light, electric current or another activator. Heat may be applied by conduction, convection, or radiation. For example, heat may be applied conductively by physically contacting a heated element (such as a soldering iron, electrical resistance heater, resistive wire, hot plate, etc.) to the monomer solution at one or more locations. The activation may be transient, lasting for less than one minute or even less than one second. In other words, after initiation of the polymerization reaction, no further external activation may be required to continue FROMP. Activation of the initiation region of the monomer solution by any mechanism (e.g., heating, light illumination and/or electricity) may encompass activation from inside or outside the monomer solution. Once the polymerization reaction is initiated and a polymerization front begins to propagate, spontaneous heating of the monomer solution may occur downstream of the polymerization front, as described above in reference to FIG. 1, until a localized region of the monomer solution reaches a temperature (e.g., 50-100° C.) sufficient for spontaneous initiation of another polymerization reaction, and then the process of spontaneous heating and generation of a new polymerization front occurs cyclically.

The spontaneous heating of the monomer solution by thermal transport away from the polymerization reaction and subsequent initiation of a new polymerization front may be understood to occur according to the following mechanism. It is postulated that instabilities in the frontal polymerization process that occur when the thermal power generated by the polymerization reaction is balanced by thermal power dissipation may promote the successive generation of new polymerization fronts. The reaction-thermal transport process during frontal polymerization may parallel Turing's postulated reaction-mass diffusion mechanism for morphogenesis. Referring to equations (1) and (2) below, the temperature of the polymerization front, T, is analogous to the morphogen concentration, $c_J$, and when considering only diffusive transport for simplicity, monomer thermal diffusivity, $\lambda$, mirrors morphogen mass diffusivity, $D_J$. Equation (3) is discussed below and represents the ratio of thermal power generated by the polymerization reaction ($P_R$) to the thermal power diffused by thermal transport ($P_T$).

$$\frac{\partial c_J}{\partial t} = f(c_A, c_I) + D_J \nabla^2 c_J \tag{1}$$

$$\frac{\partial T}{\partial t} = g(T, \alpha) + \lambda \nabla^2 T \tag{2}$$

$$\varphi = \frac{P_R}{P_T} \tag{3}$$

Local activation may occur following a small perturbation from the initial state, enhanced via autocatalysis. In frontal polymerization, a small energetic input may activate a thermally latent initiator, and transport of heat (either through diffusion, convection, or advection) from the highly exothermic polymerization reaction drives the propagation of the polymerization front. In the absence of propagation instabilities, constant temperature profiles and a homogeneous final state can be expected. Unstable frontal propagation, however, may result in symmetry breaking and the spontaneous development of Turing patterns. Useful materials patterns may emerge spontaneously during frontal polymerization in the presence of propagation instabilities.

Figure 2A:
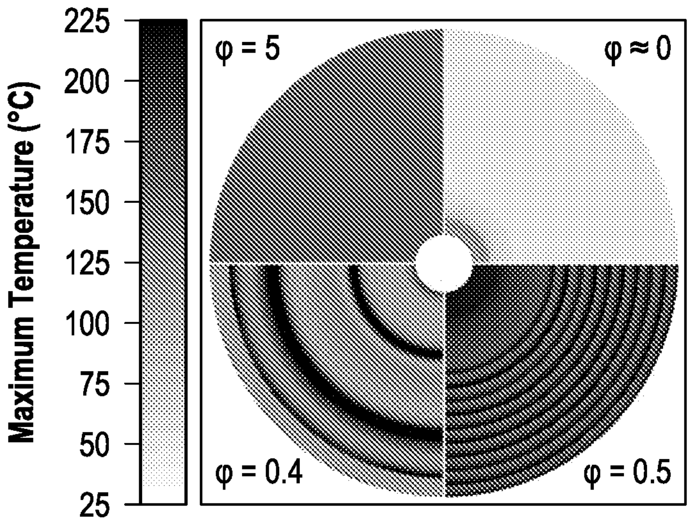
FIG. 2A shows computed thermal profiles of frontal polymerization with different values of φ for each quadrant, where the inner and outer radii of the circular area are 0.5 mm and 5 mm, respectively.
Figure 2B:
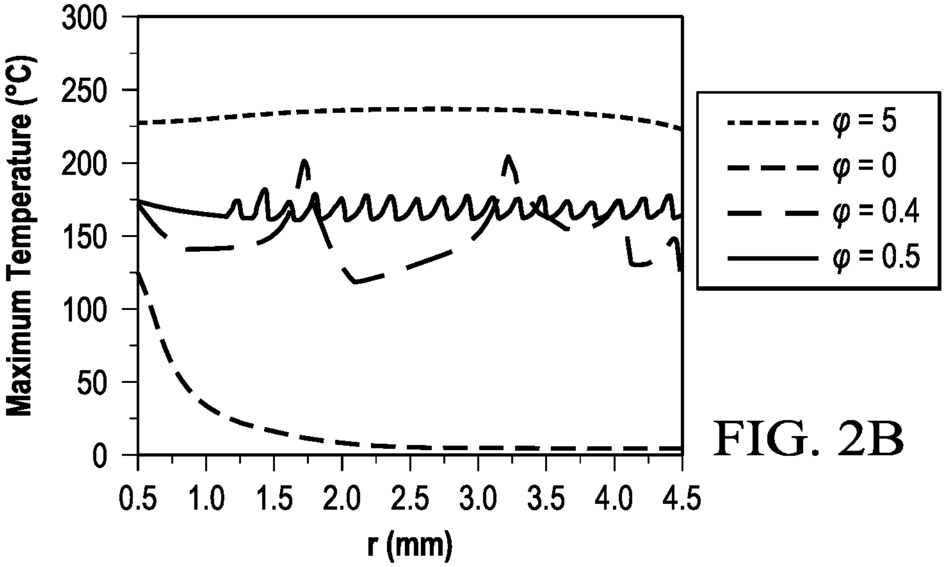
FIG. 2B shows radial profiles of maximum temperature computed for various values of φ.

Numerical simulations reveal that the development of thermal instabilities during frontal propagation may be dictated by the spatial and temporal balance of thermal power density, expressed by the ratio φ in equation (3) above, generated by the polymerization reaction and diffused by thermal transport. More specifically, the ratio $\varphi = P_R/P_T$ represents the power density generated by the polymerization reaction ("reaction power density," $P_R$, J $m^{-3}$ $s^{-1}$) over the power density diffused by thermal transport ("transport power density," $P_T$, J $m^{-3}$ $s^{-1}$). $P_R$ and $P_T$ may be computed numerically, and $P_R$ can also be determined experimentally from differential scanning calorimetry. Under typical conditions, the power generated during polymerization far exceeds that diffused by thermal transport (φ>>1), and the polymerization front propagates with constant velocity and temperature, as illustrated in the upper left quadrant of FIG. 2A, where to φ=5. When transport is dominant (φ<<1), heat diffuses away from the reaction zone faster than it is locally supplied by polymerization, and the front quenches immediately after initiation, as shown in the upper right quadrant of FIG. 2A, where φ≈0. In either limiting case, homogeneity is preserved in the system. However, when reaction and transport powers are close in value (φ=1), undulations in reaction temperature are observed, as shown in the lower quadrants of FIG. 2A, where φ=0.4 or 0.5, indicating that frontal instabilities result from a competition between reaction and transport. FIG. 2B shows maximum temperature versus radius for each value of φ.

Generally speaking, the ratio $\varphi=P_R/P_T$ may be in a range from about 0.3 to about 1.3 to promote or ensure spatial variations in reaction temperature consistent with the formation of successive polymerization fronts. Control over this competition and the resulting temperature profiles may be achieved by tuning the reaction rate through altering the chemistry and/or temperature of the monomer solution, and/or the ambient temperature. For example, prior to activation, the monomer solution may be equilibrated to an initial temperature in a range from 0° C. to 50° C. Experiments described below reveal that, as the initial temperature of the monomer solution increases, the undulations in reaction temperature may damp, and upon reaching 50° C., no undulations in reaction temperature may be observed. Altering the chemistry of the monomer solution may entail changing the catalyst, inhibitor, or monomer and/or changing the relative ratios of any of these, and in turn the heat release rate, or $P_R$, may be increased or decreased. Also or alternatively, changes in the viscosity of the monomer solution can be used to adjust the amount of transport power ($P_T$).

Figure 3:
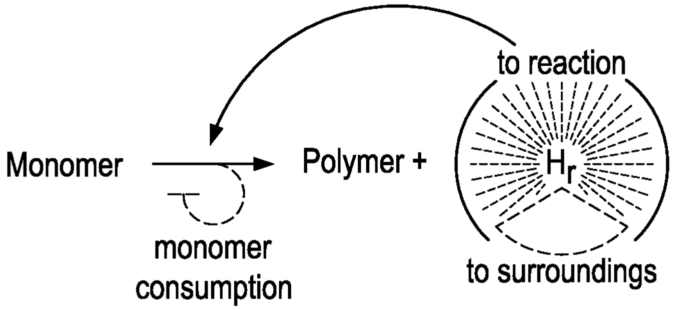
FIG. 3 schematically shows a feedback mechanism for spontaneous patterning during frontal polymerization via competition between thermal transport and chemical reactions.

Spontaneous patterning with a reaction-thermal transport process is illustrated conceptually in FIG. 3. After an initial energy input, liquid monomer is converted to solid polymer with an accompanying release of energy ($H_r$). The rapid transport (through diffusion, convection, or advection) of the energy supplied by the reaction ($H_r$) spontaneously heats unreacted monomer, leading to local activation according to Arrhenius kinetics. Consumption of the activated monomer during polymerization depletes the latent chemical energy, preventing further activation by thermal transport. Following complete consumption of the activated monomer, propagation rates slow, transport becomes dominant again, and the process repeats cyclically to generate the undulations in reaction temperature illustrated in FIG. 2 for values of φ equal to 0.4 and 0.5. In the absence of competition (φ>>1), monomer is consumed before significant local activation occurs due to the greater reaction power and a homogenous final state is obtained. Conversely, as φ approaches zero, the heat from $H_r$ is lost to the surroundings faster than it is supplied to the reaction, inhibiting the polymerization reaction and quenching fronts immediately after initiation.

Figure 4A:
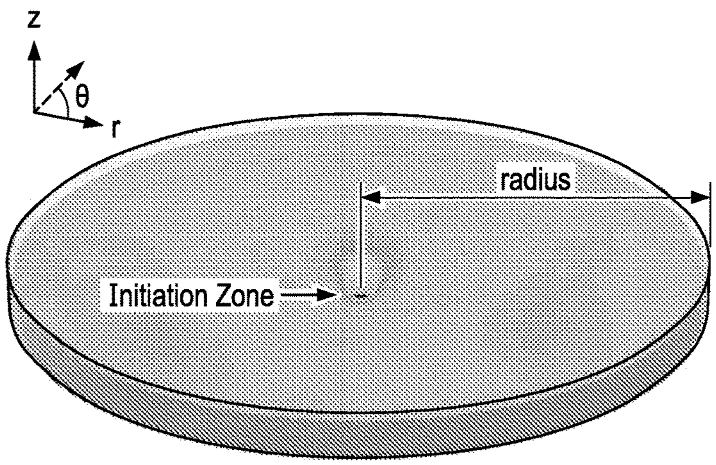
FIGS. 4A and 4B show schematic representations of cylindrical and rectangular channel molds, respectively, for containing a monomer solution; the arrows indicate exemplary initiation regions for frontal polymerization.
Figure 4B:
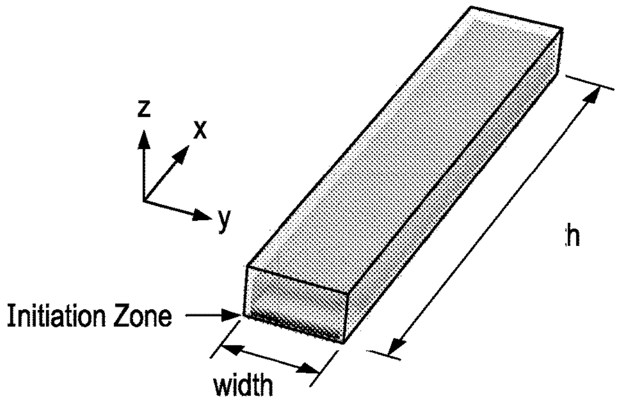

As evidenced in FIG. 2B, the spatial variations or undulations in reaction temperature may be periodic or aperiodic. In some examples, the spatial variations in reaction temperature have a wavelength in a range from about 0.01 mm to about 100 mm, or from about 0.1 mm to about 20 mm. The reaction temperature may vary from a low temperature of about 130° C. to a high temperature of about 300° C., depending at least in part on the composition of the monomer solution. Experimentally, the competition between reaction rate and thermal transport during the frontal ring-opening metathesis polymerization of DCPD and COD is observed in an open-mold geometry using cylindrical and rectangular channel molds, as shown in FIGS. 4A and 4B. The open-mold geometry may allow for increased rates of advective and convective transport in addition to thermal diffusion.

Figure 5:
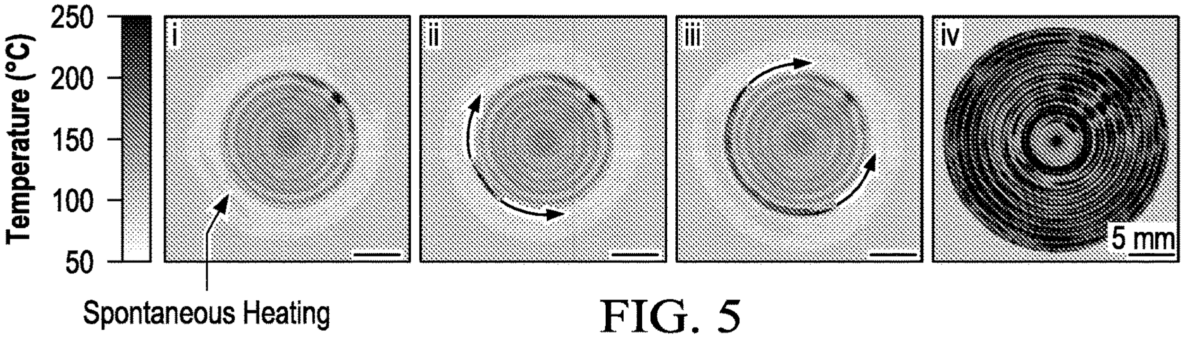
FIG. 5 shows thermal images of frontal polymerization in an open cylindrical mold with an initial temperature of 30° C., where (i) shows spontaneous heating ahead of the polymerization front at t=15 s after activation; (ii,iii) shows circumferential propagation of a new polymerization front following spontaneous heating; and (iv) shows maximum local temperature during polymerization.

The thermal images of FIG. 5 illustrate circumferential propagation of a new polymerization front in a monomer solution comprising DCPD in an open cylindrical mold. The monomer solution is at an initial temperature of 30° C. Referring first to the left-most image, thermal transport away from the initiation region during free-surface FROMP spontaneously heats a localized region of monomer ahead of the polymerization front, as indicated by the arrow. Once this preheated region reaches about 80° C., a new front initiates and propagates circumferentially, rapidly consuming the available preheated monomer, as illustrated in the adjacent images (ii, iii). Peak reaction temperatures as high as 270° C. and as low as 180° C. at the successive fronts are recorded in circular patterns with radial periodicity, as illustrated in the right-most image (iv) of FIG. 5.

Described below are examples of exploiting the spatial variations in reaction temperature achieved when FROMP is controlled as set forth above to produce a spontaneously patterned polymer that exhibits spatial variations in surface morphology, crystallinity, polymer phases, optical properties, mechanical properties and/or other characteristics.

Figure 6:
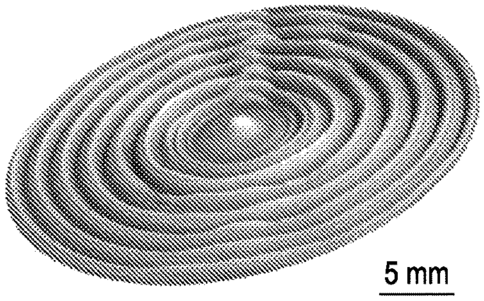
FIG. 6 shows a topographic profile obtained by optical profilometry of the sample polymerized in FIG. 5, where the vertical axis is scaled by 150% for clarity.

For example, the spatial variations in reaction temperature can lead to significant differences in thermal expansion of the monomer solution, such that circumferential or transverse surface ridges may be generated in the resulting polymer, as illustrated in FIG. 6, which shows a topographic profile of the sample corresponding to the right-most image of FIG. 5. These surface ridges may have a wavelength and amplitude that depends on the initial temperature of the monomer solution, as discussed below. The topographic profile is obtained by optical profilometry with the vertical axis scaled by 150% for clarity. Based on thermal expansion alone, assuming a coefficient of thermal expansion of 0.0010° C. and an initial monomer solution depth of 5 mm, a height difference of 450 μm is expected for a 90° C. difference in maximum reaction temperature, in good agreement with the experimentally measured maximum amplitude of 485 μm for an ambient temperature of 30° C.

Figure 7:
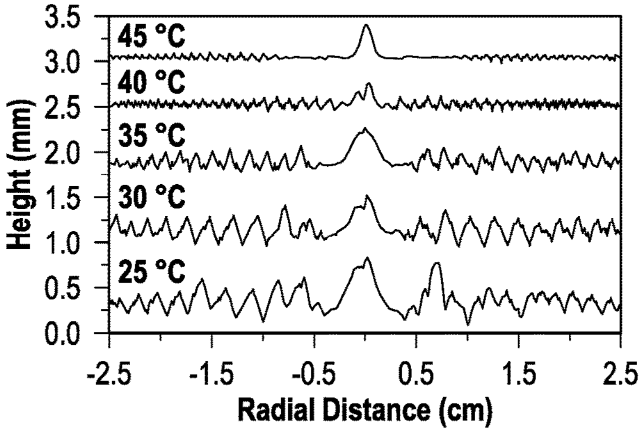
FIG. 7 shows surface height measurements of frontally polymerized samples prepared from monomer solutions at various initial temperatures.
Figure 8:
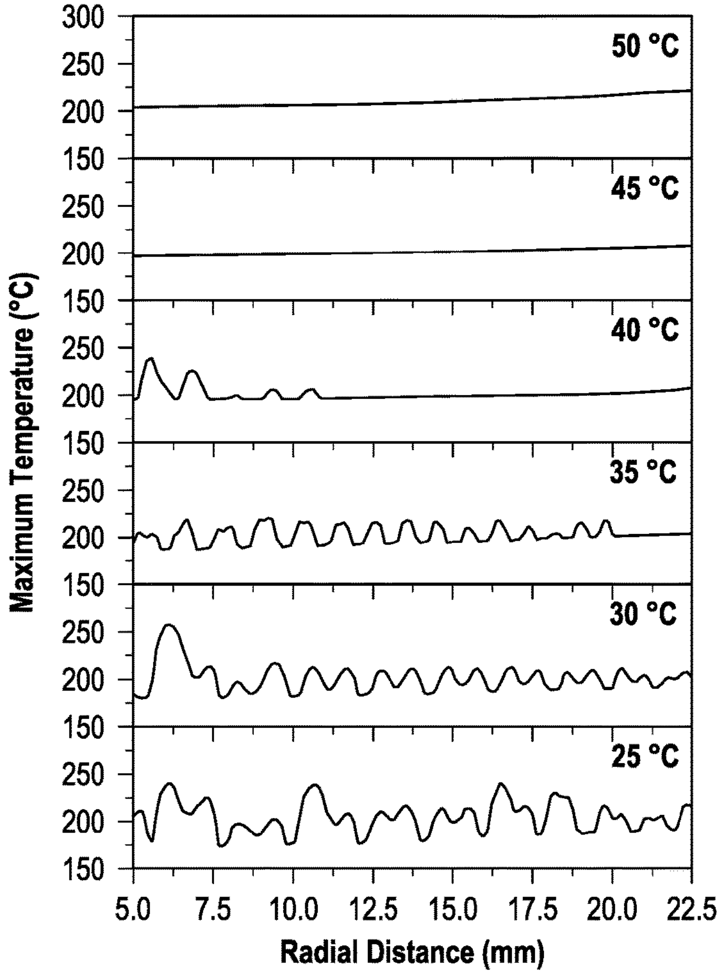
FIG. 8 shows representative maximum temperature profiles obtained during frontal polymerization for monomer solutions at various initial temperatures (TO), where data represent measurements along a single radial line.
Figure 9:
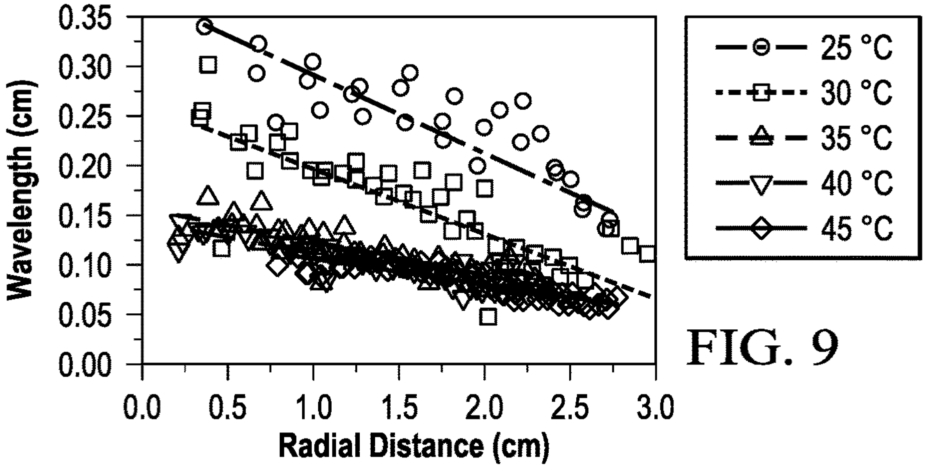
FIG. 9 shows surface feature wavelength as a function of radial distance for frontally polymerized samples prepared from monomer solutions at various initial temperatures, where both initial wavelength and wavelength decay constant (defined as the slope of the linear fits) decrease with increasing initial temperature.
Figure 10:
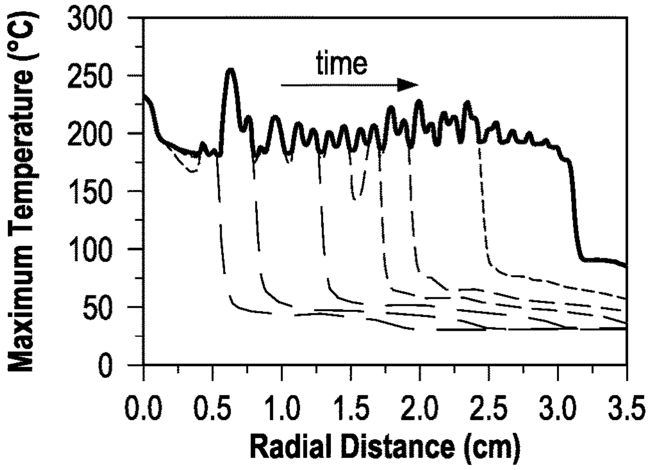
FIG. 10 shows representative maximum temperature profiles at various time points after activation; notably, the temperature of the monomer solution ahead of the polymerization front steadily increases with increasing time, which contributes to the decay in feature wavelength.

The amplitude and wavelength of the surface ridges may be systematically varied by adjusting the initial temperature of the monomer solution immediately prior to initiation of the polymerization reaction. This relationship is illustrated in FIG. 7, which shows height of the surface ridges as a function of radial distance for various initial temperatures. As the initial temperature increases, the undulations in reaction temperature damp, as shown in FIG. 8, which plots maximum temperature versus radial distance. Consequently, higher initial temperatures may be associated with decreased differences in thermal expansion and smaller ridge amplitudes. When the initial temperature reaches 50° C., no undulations in reaction temperature are observed, suggesting that $P_R$ is greater than $P_T$. The initial wavelength of the ridges may decrease with increasing initial temperature, and the wavelength of the patterns may decay with radial distance, as shown in FIG. 9. Representative maximum temperature profiles at various time points after initiation are shown in FIG. 10, where the temperature of the monomer ahead of the polymerization front can be observed to steadily increase with increasing time, which contributes to the decay in feature wavelength.

Figure 11:
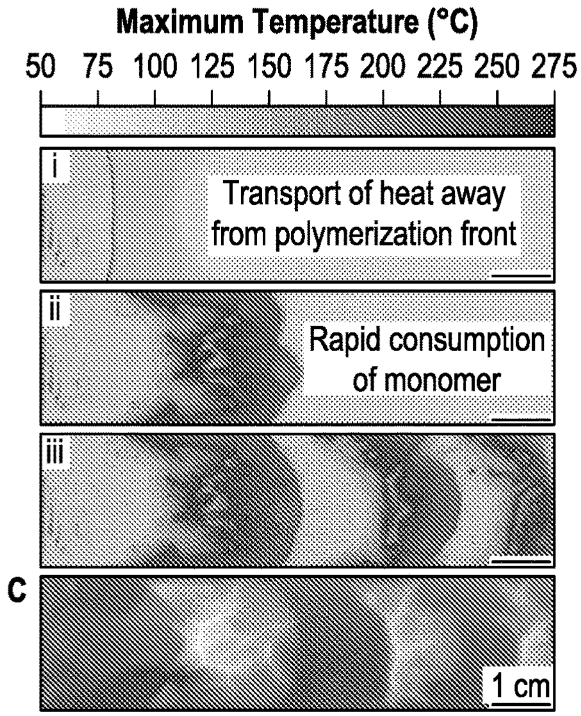
FIG. 11 shows evolution of maximum temperature profiles during FROMP in a rectangular channel, including: (i) a zone of spontaneously heated monomer; (ii) rapid, high temperature polymerization encountered during consumption of the preheated monomer; (iii) large thermal gradients encountered during unstable propagation; and the bottommost frame shows an optical image of the spontaneously patterned polymer after frontal polymerization.

Free-surface FROMP of DCPD is also investigated in a rectangular channel mold geometry, as shown in FIG. 4B. This allows for further exploration of the decay in wavelength observed in free-surface FROMP in a cylindrical mold. In the rectangular geometry, analogous to the circular geometry, the initial polymerization front travels in a longitudinal (or radial) direction, and new polymerization fronts propagate in a transverse (or circumferential) direction that intersects the radial/longitudinal direction. FIG. 11 shows maximum temperature profiles during FROMP in a rectangular channel, where the profiles show, from top to bottom: (i) a zone of spontaneously heated monomer solution comprising DCPD; (ii) rapid, high temperature polymerization encountered during consumption of preheated monomer; and (iii) large thermal gradients encountered during unstable propagation.

Figure 12:
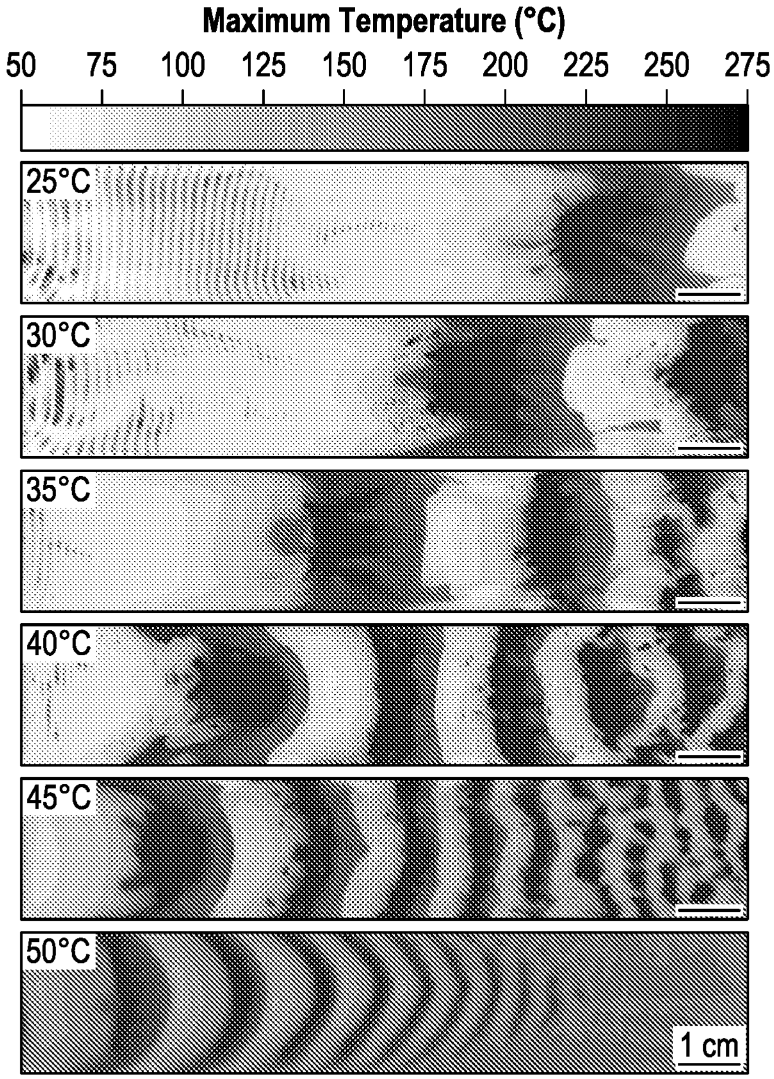
FIG. 12 shows maximum temperature profiles obtained from frontal polymerization of monomer solutions comprising DCPD at various initial temperatures; notably, feature size and spacing decrease with increasing initial temperature of the monomer solution.

Referring to the topmost thermal profile (i) of FIG. 11, as the wavelength of circumferential propagation tends toward zero, a large zone (~1 cm) of heated monomer accumulates spontaneously ahead of the front. Analogous to the short-range experiments in radial geometries, this large preheated zone is subsequently consumed in a rapid, high temperature polymerization reaction that exceeds 270° C., as shown in thermal profile (ii). Following the consumption of all of the available preheated monomer, reaction rates slow, and reaction temperatures decrease to around 200° C. This process repeats cyclically to generate the pattern shown in the third thermal profile (iii). The size and the spacing of the pattern features may be controlled by varying the initial temperature, as illustrated in FIG. 12, again demonstrating the utility of tuning the boundary conditions to generate distinct thermal profiles.

Due to the presence of spatially-defined regions of high and low reaction temperatures in the monomer solution, a secondary chemical reaction having a rate that varies as a function of temperature can be introduced to produce permanent patterns in the resulting polymer. In one example, a thermochrome, such as a phenylenediamine-based thermochrome, may be incorporated into the monomer solution to enable spatial control over the optical and/or thermomechanical properties of the polymer (e.g., pDCPD). Substituted phenylenediamines, such as N,N'-di-sec-butyl-p-phenylenediamine (DBPDA), may readily undergo single electron transfer oxidation to form stable and highly colored radical cations, known as Wister's dyes. It is postulated that, while stable at modest temperatures, the radical cations may undergo mesolytic cleavage at high temperature to form colorless species. When DBPDA is incorporated into FROMP resins cured at room temperature, a slow transition from faint red to deep purple is observed over the course of several hours, indicating formation of radical cation species in the presence of GC2.

Figure 13:
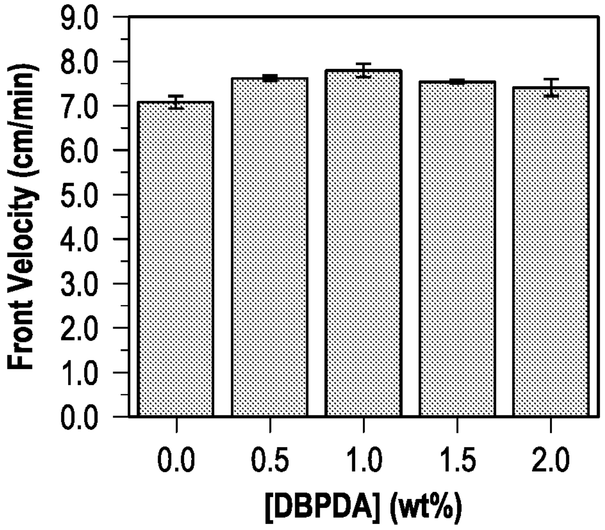
FIG. 13 shows front velocities obtained from monomer solutions including various concentrations of DBPDA in addition to DCPD.

The presence of DBPDA (e.g., up to 2 wt. %) has minimal impact on frontal propagation; monomer solutions with DBPDA exhibit nearly identical front velocities to those without DBPDA, as shown by the data of FIG. 13. FROMP experiments in a rectangular channel mold reveal that DBPDA can display highly selective thermochromism in situ, enabling a permanent visual indication of the local front temperature. The optical image at the bottom of FIG. 11 shows pDCPD after FROMP of a monomer solution including 2 wt. % DBPDA with the thermal profile (iii) during FROMP shown directly above. Decay of the radical cation results in visible bleaching at front temperatures near 250° C., and bleaching increases with increasing front temperature, up to about 270° C. In contrast, the deep purple color is retained at modest front temperatures, such as about 200° C.

The decay of radical cations may generate reaction byproducts, altering the thermomechanical properties of the resulting polymer. Indeed, the bleached regions may exhibit a 20° C. decrease in the glass transition temperature ($T_g$) compared to the unbleached region, as shown in FIG. 14. The undulations in $T_g$ correlate to trends in both bleaching and front temperature. In the absence of DBPDA, a similar thermal profile is obtained, but only a modest 8° C. change in $T_g$ is observed, indicating that DBPDA reaction products are responsible for the changes in thermomechanical properties. In other words, the polymer comprises spatially varying values of $T_g$ as a consequence of the spatial undulations in reaction temperature during FROMP as well as the presence of a temperature-sensitive additive (the thermochrome DBPDA in this example) in the monomer solution.

In ex-situ bleaching experiments carried out using pDCPD samples prepared from monomer solutions including 2 wt. % DBPDA also support the conjecture that the radical cation dye can serve as a permanent thermochrome. Upon heating the polymer samples to temperatures ranging from 175° C. to 275° C. on a hot stage, rapid and irreversible bleaching to the innate color of pDCPD is observed above 250° C. (e.g., $t_{1/2}$=25 s at 275° C.), as shown by the data in FIG. 15.

Although the above-described experiments focus on the thermochrome DBPDA, the monomer solution may include any temperature-sensitive additive that undergoes a chemical reaction at a temperature-dependent rate. For example, the temperature sensitive additive may comprise another substituted phenylene diamine (e.g., Wuster salt). In other examples, the temperature sensitive additive may comprise a liquid crystal, transient polymer, protected amine/alcohol, and/or transition metal complex. Reaction byproducts formed during polymerization may induce spatial variations in the properties of the spontaneously patterned polymer, as discussed above in the example of DBPDA.

In addition or as an alternative to the spatial variations in optical and/or thermomechanical properties described above, significant differences in polymer stiffness may be obtained in response to front temperature. For example, frontally polymerized pCOD may exhibit a spatially-varying crystallization pattern that reflects temperature variations during FROMP, where crystallized regions exhibit higher stiffnesses than amorphous regions. The inventors recognized that the cis/trans ratio of COD could vary with reaction temperature, thereby allowing a patterned polymer including regions of both amorphous and crystalline material to be formed by FROMP.

FIG. 16 shows a maximum temperature profile during free-surface FROMP of COD (top) in a rectangular channel mold and an optical image (bottom) of the resulting patterned polymer showing crystalline (white) and amorphous (yellow) domains. The numbered markers (1, 2, and 3) in the optical image represent measurement locations for subsequent characterization. During free-surface FROMP of COD, as with the DCPD systems described above, significant thermal transport outside the reaction zone generates a large region of heated monomer, which upon initiation at about 70° C. is rapidly consumed in a high temperature polymerization reaction. This process repeats cyclically until all monomer is consumed. It is noted that the low ring-strain of cyclooctadiene may limit $P_R$ generated during the ring-opening reaction, which may result in a transportdominated imbalance in cp. As a result, pattern control with COD may be more challenging than with DCPD.

Figure 17:
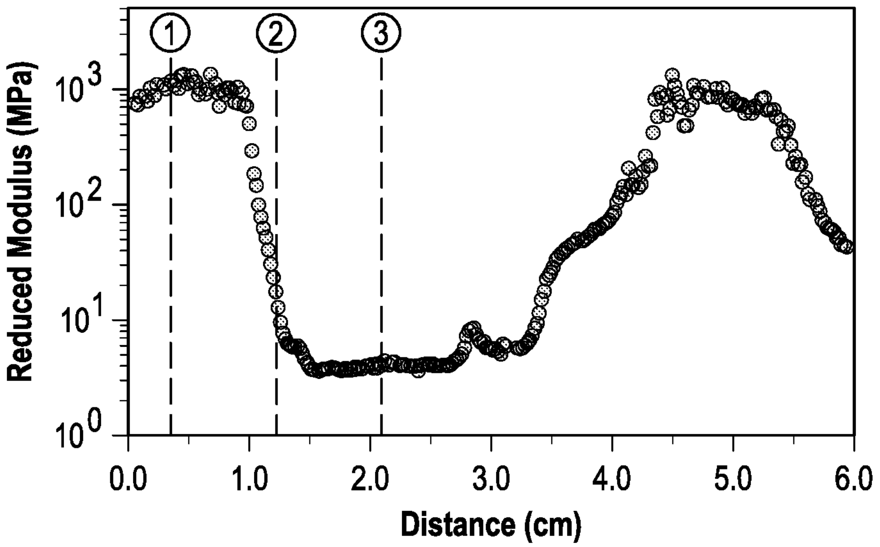
FIG. 17 shows reduced modulus as a function of distance from the initiation region obtained via nanoindentation, where the numbers correspond to the regions labeled in FIG. 16.
Figure 18:
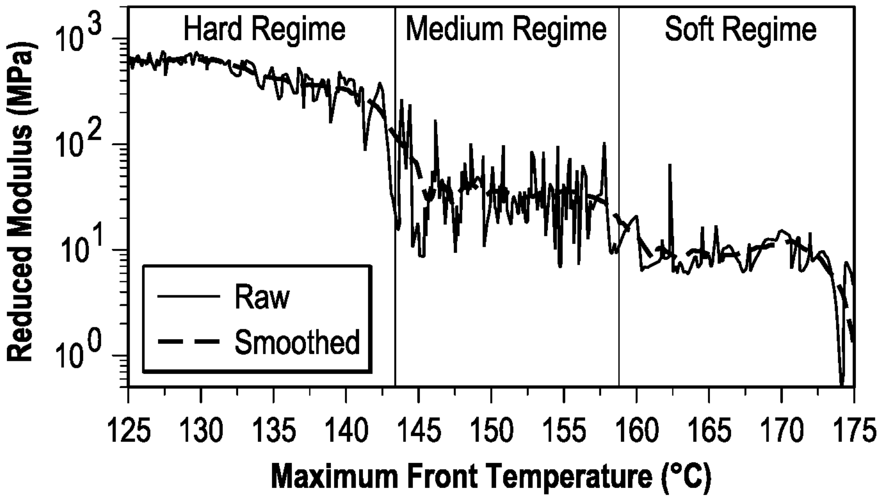
FIG. 18 shows reduced modulus as a function of maximum front temperature obtained through spatial correlation of nanoindentation scans and thermal profiles, where the smoothed curve (black) is obtained from adjacent averaging 100 points of raw data (grey).

After polymerization, the pCOD is cooled and held at room temperature (e.g., for 24 h). During this time, the areas that experienced low front temperatures (e.g., about 115° C. to 125° C.) crystallize to form a white opaque material, while regions with higher front temperatures (e.g., greater than about 145° C.) remain a transparent yellow. The presence of crystalline pCOD domains in region 1 of FIG. 16 is confirmed with wide-angle X-ray scattering (WAXS) analysis; the intensity of the crystalline peak decreases significantly through the transition region (region 2), until only an amorphous halo remains in region 3, indicating a fully amorphous phase. The temperature-responsive crystallization of pCOD yields a spontaneously patterned polymer with hard and soft domains. The changes in stiffness between the crystalline and amorphous domains are measured by nanoindentation. The reduced modulus varies by several orders of magnitude, reaching a maximum of 1.3 GPa and a minimum of 3 MPa as shown in FIG. 17. The stiffness correlates well with the physical characteristics, spectroscopic properties, and the maximum front temperature, where higher front temperature results in lower stiffness, as shown in FIG. 18. Correlation between front temperature and stiffness reveal three distinct stiffness regimes in the patterned polymer: (1) a hard regime with moduli ranging from 200 MPa to 1 GPa, where front temperatures remain less than 143° C.; (2) a transitional regime with moduli near 30 MPa; and (3) a soft regime with moduli of approximately 5 MPa, where front temperatures remain above 160° C. The relationship between stiffness and front temperature is a key design principle when developing patterns for engineering applications.

As demonstrated in this disclosure, rapid reaction-thermal transport during frontal polymerization may be harnessed to drive the emergence of spatially varying thermal profiles during the synthesis of robust structural materials. Tuning of the reaction kinetics and thermal transport may enable internal feedback control over thermal gradients to spontaneously pattern morphological, chemical, optical, and mechanical properties of thermosets and thermoplastics. This work suggests a facile route to patterned structural materials with complex microstructures without the need for masks, molds, or printers utilized in conventional manufacturing. Moreover, it is postulated that more sophisticated control of the reaction-transport driven fronts may enable spontaneous growth of structures and patterns in synthetic materials, inaccessible by traditional manufacturing approaches.

The subject matter of this disclosure may also relate, among others, to the following aspects:

A first aspect relates to a method of spontaneously patterning a polymer during frontal polymerization, the method comprising: activating an initiation region of a monomer solution to initiate a polymerization reaction, whereby a polymerization front is generated and propagates through the monomer solution in a radial or longitudinal direction away from the initiation region; spontaneously heating the monomer solution downstream of the polymerization front by thermal transport away from the polymerization reaction, a localized region of the monomer solution reaching a temperature sufficient for spontaneous initiation of another polymerization reaction, whereby a new polymerization front is generated and propagates through the monomer solution in a circumferential or transverse direction; and wherein the spontaneous heating of the monomer solution downstream of the polymerization front and the initiation of another polymerization reaction occurs cyclically, producing multiple new polymerization fronts and spatial variations in reaction temperature across the monomer solution, thereby enabling a spontaneously patterned polymer to be formed.

A second aspect relates to the method of the first aspect, wherein the spontaneously patterned polymer exhibits spatial variations in surface morphology, crystallinity, polymer phases, optical properties, thermomechanical characteristics, and/or mechanical properties.

A third aspect relates to the method of the first or second aspect, wherein, prior to the activation, the monomer solution is equilibrated to an initial temperature in a range from about 0° C. to about 50° C.

A fourth aspect relates to the method of any preceding aspect, wherein a ratio $\varphi = P_R/P_T$ of a reaction power density ($P_R$, J $m^{-3}$ $s^{-1}$) and transport power density ($P_T$, J $m^{-3}$ $s^{-1}$) is in a range from about 0.3 to about 1.3.

A fifth aspect relates to the method of any preceding aspect, wherein the temperature sufficient for spontaneous initiation of another polymerization reaction is in a range from about 50° C. to about 100° C.

A sixth aspect relates to the method of any preceding aspect, wherein the reaction temperature varies from a low temperature of about 130° C. to a high temperature of about 300° C.

A seventh aspect relates to the method of any preceding aspect, wherein the spatial variations in reaction temperature are periodic or aperiodic.

An eighth aspect relates to the method of any preceding aspect, wherein the spatial variations in reaction temperature have a wavelength in a range from about 0.01 mm to about 100 mm.

A ninth aspect relates to the method of any preceding aspect, wherein the monomer solution is contained in an open mold, closed mold, or other container.

A tenth aspect relates to the method of any preceding aspect, wherein the monomer solution includes one or more monomers, a catalyst, and an inhibitor.

An eleventh aspect relates to the method of the tenth aspect, wherein the one or more monomers comprise a cyclic olefin, wherein the catalyst comprises $2^{nd}$ generation Grubbs catalyst (GC2) or another ruthenium catalyst, and wherein the inhibitor comprises trimethyl phosphite (TMP), triethyl phosphite (TEP), triisopropyl phosphite (TIPP), tributyl phosphite (TBP), triphenyl phosphite (TPP), and/or 4-dimethylaminopyridine (DMAPF).

A twelfth aspect relates to the method of the tenth or eleventh aspect, wherein the one or more monomers comprise dicyclopentadiene (DCPD), 1,5-cyclooctadiene (COD), and/or ethylidene norbornene (ENB).

A thirteenth aspect relates to the method of any preceding aspect, wherein the activating comprises exposing the initiation region to heat, light, or electric current.

A fourteenth aspect relates to the method of any preceding aspect, wherein the monomer solution comprises spatial differences in thermal expansion and the spontaneously patterned polymer exhibits a succession of surface ridges.

A fifteenth aspect relates to the method of the fourteenth aspect, wherein an amplitude and/or wavelength of the surface ridges depends on an initial temperature of the monomer solution.

A sixteenth aspect relates to the method of any preceding aspect, wherein the monomer solution comprises a temperature-sensitive additive that undergoes a chemical reaction having a temperature-dependent rate.

A seventeenth aspect relates to the method of the sixteenth aspect, wherein the temperature-sensitive additive comprises a thermochrome.

An eighteenth aspect relates to the method of the sixteenth or seventeenth aspect, wherein the spontaneously patterned polymer includes alternating bleached and unbleached regions.

A nineteenth aspect relates to the method of any preceding aspect, wherein the spontaneously patterned polymer exhibits its spatial variations in stiffness.

A twentieth aspect relates to the method of any preceding aspect, wherein the spontaneously patterned polymer comprises spatially varying values of $T_g$.

A twenty-first aspect relates to a spontaneously patterned polymer formed by the method of any preceding claim and comprising spatial variations in surface morphology, crystallinity, polymer phases, optical properties, thermomechanical characteristics, and/or mechanical properties.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of spontaneously patterning a polymer during frontal polymerization, the method comprising:

activating an initiation region of a monomer solution to initiate a polymerization reaction, the monomer solution including one or more monomers, a catalyst, and an inhibitor, whereby a polymerization front is generated and propagates through the monomer solution in a radial or longitudinal direction away from the initiation region;

spontaneously heating the monomer solution downstream of the polymerization front by thermal transport away from the polymerization reaction, a localized region of the monomer solution reaching a temperature sufficient for spontaneous initiation of another polymerization reaction, whereby a new polymerization front is generated and propagates through the monomer solution in a circumferential or transverse direction; and wherein the spontaneous heating of the monomer solution downstream of the polymerization front and the initiation of another polymerization reaction occurs cyclically, producing multiple new polymerization fronts and spatial variations in reaction temperature across the monomer solution, thereby enabling a spontaneously patterned polymer to be formed.

2. The method of claim 1, wherein the spontaneously patterned polymer exhibits spatial variations in surface morphology, crystallinity, polymer phases, optical properties, thermomechanical characteristics, and/or mechanical properties.

3. The method of claim 1, wherein, prior to the activation, the monomer solution is equilibrated to an initial temperature in a range from about 0° C. to about 50° C.

4. The method of claim 1, wherein the temperature sufficient for spontaneous initiation of another polymerization reaction is in a range from about 50° C. to about 100° C.

5. The method of claim 1, wherein the reaction temperature varies from a low temperature of about 130° C. to a high temperature of about 300° C.

6. The method of claim 1, wherein the spatial variations in reaction temperature are periodic or aperiodic.

7. The method of claim 1, wherein the spatial variations in reaction temperature have a wavelength in a range from about 0.01 mm to about 100 mm.

8. The method of claim 1, wherein the monomer solution is contained in an open mold, closed mold, or other container.

9. The method of claim 1, wherein the one or more monomers comprise a cyclic olefin, wherein the catalyst comprises $2^{nd}$ generation Grubbs catalyst (GC2) or another ruthenium catalyst, and wherein the inhibitor comprises trimethyl phosphite (TMP), triethyl phosphite (TEP), triisopropyl phosphite (TIPP), tributyl phosphite (TBP), triphenyl phosphite (TPP), and/or 4-dimethylaminopyridine (DMAPF).

10. The method of claim 1, wherein the activating comprises exposing the initiation region to heat, light, or electric current.

11. The method of claim 1, wherein the monomer solution comprises spatial differences in thermal expansion and the spontaneously patterned polymer exhibits a succession of surface ridges.

12. The method of claim 11, wherein an amplitude and/or wavelength of the surface ridges depends on an initial temperature of the monomer solution.

13. The method of claim 1, wherein the monomer solution comprises a temperature-sensitive additive that undergoes a chemical reaction having a temperature-dependent rate.

14. The method of claim 13, wherein the temperature-sensitive additive comprises a thermochrome.

15. The method of claim 13, wherein the spontaneously patterned polymer includes alternating bleached and unbleached regions.

16. The method of claim 1, wherein the spontaneously patterned polymer exhibits spatial variations in stiffness.

17. The method of claim 1, wherein the spontaneously patterned polymer comprises spatially varying values of $T_g$.

18. A spontaneously patterned polymer formed by the method of claim 1 and comprising spatial variations in surface morphology, crystallinity, polymer phases, optical properties, thermomechanical characteristics, and/or mechanical properties.

19. A method of spontaneously patterning a polymer during frontal polymerization, the method comprising:

activating an initiation region of a monomer solution to initiate a polymerization reaction by exposing the initiation region to heat, light, or electric current, whereby a polymerization front is generated and propagates through the monomer solution in a radial or longitudinal direction away from the initiation region;

spontaneously heating the monomer solution downstream of the polymerization front by thermal transport away from the polymerization reaction, a localized region of the monomer solution reaching a temperature sufficient for spontaneous initiation of another polymerization reaction, whereby a new polymerization front is generated and propagates through the monomer solution in a circumferential or transverse direction; and wherein the spontaneous heating of the monomer solution downstream of the polymerization front and the initiation of another polymerization reaction occurs cyclically, producing multiple new polymerization fronts and spatial variations in reaction temperature across the monomer solution, thereby enabling a spontaneously patterned polymer to be formed.

20. A method of spontaneously patterning a polymer during frontal polymerization, the method comprising:

activating an initiation region of a monomer solution to initiate a polymerization reaction, whereby a polymerization front is generated and propagates through the monomer solution in a radial or longitudinal direction away from the initiation region;

spontaneously heating the monomer solution downstream of the polymerization front by thermal transport away from the polymerization reaction, a localized region of the monomer solution reaching a temperature sufficient for spontaneous initiation of another polymerization reaction, whereby a new polymerization front is generated and propagates through the monomer solution in a circumferential or transverse direction, wherein a ratio $\varphi = P_R/P_T$ of a reaction power density ($P_R$, J $m^{-3}$ $s^{-1}$) and transport power density ($P_T$, J $m^{-3}$ $s^{-1}$) is in a range from about 0.3 to about 1.3, and wherein the spontaneous heating of the monomer solution downstream of the polymerization front and the initiation of another polymerization reaction occurs cyclically, producing multiple new polymerization fronts and spatial variations in reaction temperature across the monomer solution, thereby enabling a spontaneously patterned polymer to be formed.

* * * * *